No. 648,113. Patented Apr. 24, 1900.
I. E. PALMER.
SUSPENSION DEVICE.
(Application filed Feb. 20, 1900.)
(No Model.) 2 Sheets—Sheet 1.

Witnesses:
George Barry Jr.
Edward Vieser

Inventor:
Isaac E. Palmer
by attorneys
Brown & Seward

No. 648,113. Patented Apr. 24, 1900.
I. E. PALMER.
SUSPENSION DEVICE.
(Application filed Feb. 20, 1900.)
(No Model.) 2 Sheets—Sheet 2.

Witnesses:
George Barry Jr.
Edward Vieser

Inventor:
Isaac E. Palmer
by attorneys
Brown & Seward

UNITED STATES PATENT OFFICE.

ISAAC E. PALMER, OF MIDDLETOWN, CONNECTICUT.

SUSPENSION DEVICE.

SPECIFICATION forming part of Letters Patent No. 648,113, dated April 24, 1900.

Application filed February 20, 1900. Serial No. 5,893. (No model.)

*To all whom it may concern:*

Be it known that I, ISAAC E. PALMER, a citizen of the United States, and a resident of Middletown, in the county of Middlesex and State of Connecticut, have invented a new and useful Improvement in Suspension Devices, of which the following is a specification.

My invention relates to an improvement in suspension devices, and more particularly to an improvement in suspension devices in connection with hammocks and the like.

The object of my invention is to provide a suspension device in which the friction between the suspension-hook and the suspension eye or loop is reduced to a minimum, in which all squeaking or rattling of the parts is avoided, and in which a substantially-antifriction bearing is obtained between the said hook and eye irrespective of the angular position in a vertical direction of the eye.

With these ends in view my invention has more particularly for its object to provide a suspension device comprising a hook and an eye or loop, the one being provided with a bearing-surface and the other with a projection arranged to engage the said bearing-surface.

A practical embodiment of my invention is represented in the accompanying drawings, in which—

Figure 1:
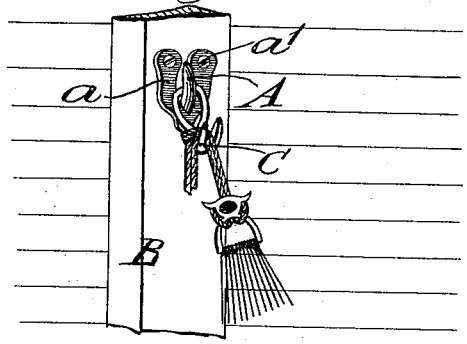
Figure 2:
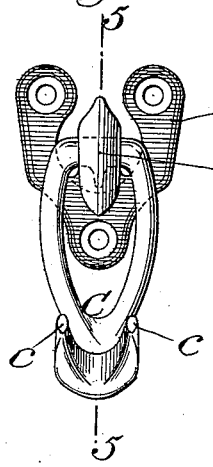
Figure 3:
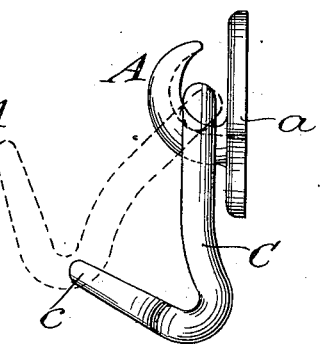
Figure 4:
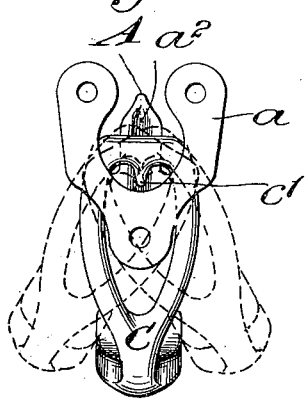
Figure 6:
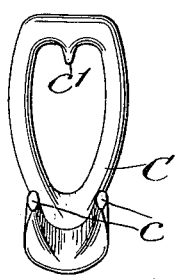
Figure 5:
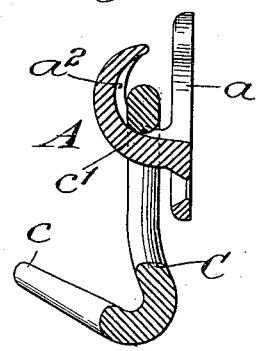
Figure 7:
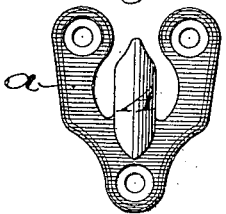
Figure 8:
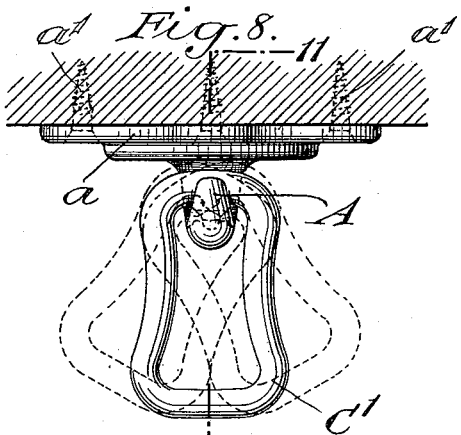
Figure 9:
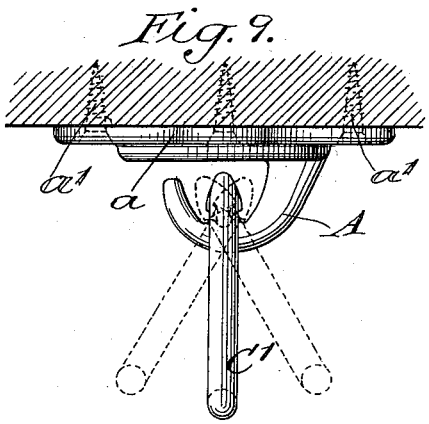
Figure 10:
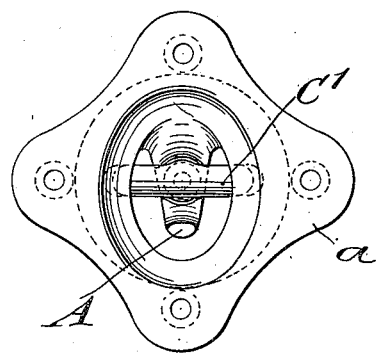
Figure 11:
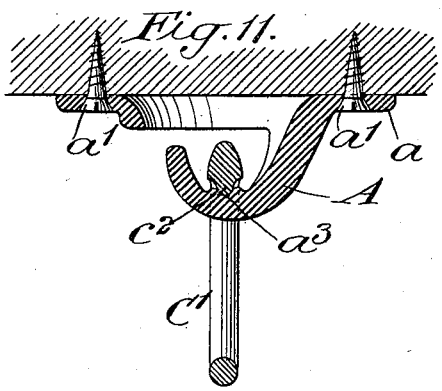
Figure 12:
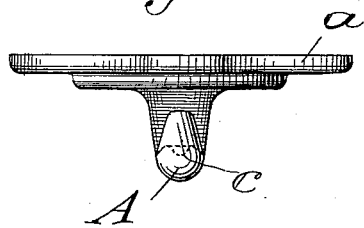
Figure 13:
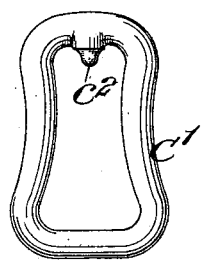

Figure 1 represents in perspective the suspension device as applied to a vertical support—such, for instance, as a post or pillar—the said view also illustrating one manner of attaching the end of a hammock thereto. Fig. 2 represents a front view of the suspension device. Fig. 3 is a side view of the same, the suspension eye or loop being represented in dotted lines in a different angular position in a vertical plane. Fig. 4 represents a back view of the suspension device, the suspension eye or loop being represented in dotted lines in two different positions which it would assume when it is rocked. Fig. 5 is a vertical central section through the suspension device, taken in the plane of the line 5 5 of Fig. 2. Fig. 6 is a detail front view of the suspension eye or loop. Fig. 7 is a detail front view of the suspension-hook. Fig. 8 is a front view of a suspension device which is intended for attachment to a horizontal surface—such, for instance, as a ceiling—the suspension eye or loop being represented in dotted lines in two of its lateral swinging positions. Fig. 9 is a side view of the suspension device, the suspension eye or loop being represented in dotted lines in two of its forward and back swinging positions. Fig. 10 is a top plan view of the suspension device. Fig. 11 is a vertical central section taken in the plane of the line 11 11 of Fig. 8. Fig. 12 is a front view of the suspension-hook, and Fig. 13 is a front view of the suspension eye or loop.

Proceeding to describe the form of suspension device illustrated in Figs. 1 to 7, inclusive, the suspension-hook is denoted by A, and it may be permanently attached to some suitable support—such, for instance, as a vertical upright or post B—by providing the hook A with an attaching plate or base $a$, which is engaged by one or more screws or fastening devices $a'$. In the present instance there are three of these screws $a'$ shown, one at the lower portion of the plate and the other two in the ends of two uprising branches thereof. The hook A is curved outwardly and upwardly from the base or plate $a$, and an elongated shallow recess $a^2$ is formed along its inner surface from its base to a point near the free end of the hook. The suspension eye or loop is denoted by C, and it may be provided with suitable cord or rope attaching-prongs $c$, as is usual. The top of the eye or loop C is provided with an inwardly-extended bearing projection $c'$, which projection is tapered to a blunt point. When the eye or loop C is engaged with the hook A, it will have a bearing thereon by reason of the projection $c'$ resting in the groove $a^2$ in the inner surface of the said hook. By this arrangement the hook will be permitted to swing laterally to a considerable degree upon this bearing between the projection $c'$ and the inner surface of the hook. By reason of the elongated recess this swinging movement above described of the eye or loop is not interfered with by the different angular positions in a vertical plane of the said eye or loop.

Proceeding to describe the form shown in Figs. 8 to 13, inclusive, the attaching base or plate $a$ may be secured to some suitable horizontal support—such, for instance, as by screws $a'$. The inner surface of the hook A is in this instance provided with a recess $a^3$, which recess is so arranged that when the suspension eye or loop C' is supported by the hook the projection $c^2$ will rest within the said recess $a^3$. By reason of this engagement between the two parts the suspension eye or loop C' is permitted to be rocked in any direction freely with a minimum amount of friction and with no rattling or slipping of the parts one upon the other. The eye or loop C' represented in connection with the ceiling attachment is here represented as having the attaching-prongs $c$ omitted.

It is evident that slight changes might be resorted to in the form and arrangement of the several parts without departing from the spirit and scope of my invention. Hence I do not wish to limit myself strictly to the structure herein shown and described; but

What I claim is—

1. A suspension device comprising a hook and a loop or eye for engaging the hook, the one being provided with a bearing-recess and the other with a bearing projection adapted to seat in the recess, substantially as set forth.

2. A suspension device comprising a hook having a bearing-recess in its inner surface and a suspension eye or loop having a bearing projection adapted to seat in the said recess, substantially as set forth.

3. A suspension device comprising a hook having a bearing-recess in its inner surface and an eye or loop having an inwardly-extended bearing projection arranged to seat within the said recess in the hook to form a bearing for the eye or loop, substantially as set forth.

4. A suspension device comprising a curved hook having an elongated recess along its inner surface and an eye or loop having an inwardly-extended projection arranged to seat within the said recess and fitted to slide along the same to accommodate itself to different angular positions of the suspension eye or loop in a vertical plane, substantially as set forth.

In testimony that I claim the foregoing as my invention I have signed my name, in presence of two witnesses, this 16th day of February, 1900.

ISAAC E. PALMER.

Witnesses:
PAUL S. CARRIER,
GEORGE A. WELLMAN.